(12) United States Patent
DiSalvo et al.

(10) Patent No.: US 7,800,874 B2
(45) Date of Patent: Sep. 21, 2010

(54) CIRCUIT INTERRUPTING DEVICE WITH AUTOMATIC TEST

(75) Inventors: Nicholas L. DiSalvo, Levittown, NY (US); Ross Mernyk, Brooklyn, NY (US); Roger M. Bradley, North Bellmore, NY (US); Stephen Stewart, Pembroke Pines, FL (US); Frantz Germain, Rosedale, NY (US); Armando Calixto, Floral Park, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 0 days.

(21) Appl. No.: 12/118,419

(22) Filed: May 9, 2008

(65) Prior Publication Data

US 2009/0040667 A1 Feb. 12, 2009

Related U.S. Application Data

(63) Continuation of application No. 11/466,757, filed on Aug. 23, 2006, now Pat. No. 7,372,678.

(60) Provisional application No. 60/711,303, filed on Aug. 24, 2005.

(51) Int. Cl.
 *H02H 3/00* (2006.01)
(52) U.S. Cl. ......................................... 361/42
(58) Field of Classification Search ............... 361/42
 See application file for complete search history.

(56) References Cited

U.S. PATENT DOCUMENTS

| 1,770,398 A | 7/1930 | Gallop et al. |
| 1,870,810 A | 8/1932 | Hoard |
| 1,967,110 A | 7/1934 | Bergvall |
| 2,309,433 A | 1/1943 | Anderson |
| 3,252,086 A | 5/1966 | Lundstrom |
| 3,259,802 A | 7/1966 | Steen |
| 3,668,474 A | 6/1972 | Knox |
| 4,140,964 A * | 2/1979 | Eubank et al. .............. 324/551 |
| 4,159,499 A | 6/1979 | Bereskin |
| 4,314,300 A | 2/1982 | Griffith |
| 4,455,654 A | 6/1984 | Bhaskar et al. |
| 4,707,759 A | 11/1987 | Bodkin |
| 4,742,422 A | 5/1988 | Tigges |
| 4,751,608 A | 6/1988 | Schultz |
| 5,136,458 A | 8/1992 | Durivage |

(Continued)

FOREIGN PATENT DOCUMENTS

CA 2383738 7/2000

(Continued)

OTHER PUBLICATIONS

International Search Report and the Written Opinion of the International Searching Authority mailed on Feb. 12, 2008 for PCT/US2007/070256 filed on Jun. 1, 2007. 3 pages.

*Primary Examiner*—Stephen W Jackson
(74) *Attorney, Agent, or Firm*—Collard & Roe, P.C.

(57) ABSTRACT

Resettable circuit interrupting devices having self-test and non-resettable or limited resettable power interrupting systems are provided. The permanent power interrupting system activates when a circuit interrupting device is no longer capable of operating in accordance with applicable standards governing such devices or the device is no longer capable of operating in accordance with its design characteristics.

28 Claims, 10 Drawing Sheets

U.S. PATENT DOCUMENTS

| | | | |
|---|---|---|---|
| 5,175,403 A | 12/1992 | Hamm et al. | |
| 5,202,662 A | 4/1993 | Bienwald et al. | |
| 5,214,560 A | 5/1993 | Jensen | |
| 5,270,900 A | 12/1993 | Alden et al. | |
| 5,309,310 A | 5/1994 | Baer et al. | |
| 5,386,183 A | 1/1995 | Cronvich et al. | |
| 5,418,678 A | 5/1995 | McDonald | |
| 5,424,894 A | 6/1995 | Briscall et al. | |
| 5,450,328 A * | 9/1995 | Janke et al. | 702/65 |
| 5,475,609 A | 12/1995 | Apothaker | |
| 5,477,412 A | 12/1995 | Neiger et al. | |
| 5,600,524 A | 2/1997 | Neiger et al. | |
| 5,715,125 A | 2/1998 | Neiger et al. | |
| 5,784,753 A | 7/1998 | Kaczmarz et al. | |
| 5,825,599 A | 10/1998 | Rosenbaum | |
| 5,875,087 A | 2/1999 | Spencer et al. | |
| 5,956,218 A | 9/1999 | Berthold | |
| 5,969,920 A | 10/1999 | Mackenzie | |
| 5,978,191 A | 11/1999 | Bonniau et al. | |
| 5,982,593 A | 11/1999 | Kimblin et al. | |
| 5,994,883 A | 11/1999 | Liu | |
| 6,052,265 A | 4/2000 | Zaretsky et al. | |
| 6,052,266 A | 4/2000 | Aromin | |
| 6,054,865 A * | 4/2000 | Bald et al. | 324/551 |
| 6,111,733 A | 8/2000 | Neiger et al. | |
| 6,169,405 B1 | 1/2001 | Baltzer et al. | |
| 6,191,589 B1 | 2/2001 | Clunn | |
| 6,253,121 B1 | 6/2001 | Cline | |
| 6,262,550 B1 | 7/2001 | Kliman et al. | |
| 6,262,871 B1 | 7/2001 | Nemir et al. | |
| 6,292,337 B1 | 9/2001 | Legatti et al. | |
| 6,370,001 B1 | 4/2002 | Macbeth | |
| 6,421,214 B1 | 7/2002 | Packard et al. | |
| 6,421,618 B1 | 7/2002 | Kliman et al. | |
| 6,426,632 B1 | 7/2002 | Clunn | |
| 6,426,634 B1 | 7/2002 | Clunn et al. | |
| 6,433,977 B1 | 8/2002 | Macbeth | |
| 6,437,700 B1 | 8/2002 | Herzfeld et al. | |
| 6,456,471 B1 | 9/2002 | Haun et al. | |
| 6,522,510 B1 | 2/2003 | Finlay et al. | |
| 6,532,424 B1 | 3/2003 | Haun et al. | |
| 6,538,863 B1 | 3/2003 | Macbeth | |
| 6,674,289 B2 | 1/2004 | Macbeth | |
| 6,789,209 B1 | 9/2004 | Suzuki et al. | |
| 6,807,035 B1 | 10/2004 | Baldwin et al. | |
| 6,807,036 B2 | 10/2004 | Baldwin | |
| 6,831,819 B2 | 12/2004 | Nemir et al. | |
| 6,856,498 B1 | 2/2005 | Finlay, Sr. | |
| 6,864,766 B2 | 3/2005 | DiSalvo et al. | |
| 6,873,158 B2 | 3/2005 | Macbeth | |
| 6,980,005 B2 | 12/2005 | Finlay, Sr. et al. | |
| 7,079,363 B2 | 7/2006 | Chung | |
| 7,133,266 B1 | 11/2006 | Finlay | |
| 7,149,065 B2 | 12/2006 | Baldwin et al. | |
| 7,173,428 B2 | 2/2007 | Hurwicz | |
| 7,173,799 B1 | 2/2007 | Weeks et al. | |
| 7,177,129 B2 | 2/2007 | Arenz et al | |
| 7,195,500 B2 | 3/2007 | Huang et al. | |
| 7,212,386 B1 | 5/2007 | Finlay, Sr. et al. | |
| 7,253,629 B1 | 8/2007 | Richards et al. | |
| 7,265,956 B2 | 9/2007 | Huang et al. | |
| 7,268,559 B1 | 9/2007 | Chen et al. | |
| 7,282,921 B2 | 10/2007 | Sela et al. | |
| 7,289,306 B2 | 10/2007 | Huang | |
| 7,295,415 B2 | 11/2007 | Huang et al. | |
| 7,315,437 B2 | 1/2008 | Bonilla et al. | |
| 7,372,678 B2 | 5/2008 | DiSalvo et al. | |
| 2002/0078511 A1 | 6/2002 | Blair et al. | |
| 2002/0181175 A1 | 12/2002 | Baldwin et al. | |
| 2004/0252425 A1 | 12/2004 | Baldwin et al. | |
| 2005/0036250 A1 | 2/2005 | Asano | |
| 2005/0063109 A1 | 3/2005 | Baldwin | |
| 2005/0264427 A1 | 12/2005 | Zeng et al. | |
| 2006/0125622 A1 | 6/2006 | Baldwin et al. | |
| 2007/0014068 A1 | 1/2007 | Huang et al. | |
| 2007/0086127 A1 | 4/2007 | Huang | |
| 2007/0091520 A1 | 4/2007 | Angelides et al. | |
| 2007/0165342 A1 | 7/2007 | Elms | |
| 2007/0208520 A1 | 9/2007 | Zhang et al. | |
| 2007/0227506 A1 | 10/2007 | Perryman et al. | |
| 2007/0279814 A1 | 12/2007 | Bonilla et al. | |
| 2008/0002313 A1 | 1/2008 | DiSalvo et al. | |
| 2008/0007879 A1 | 1/2008 | Zaretsky et al. | |
| 2008/0013227 A1 | 1/2008 | Mernyk et al. | |
| 2008/0022153 A1 | 1/2008 | Wang et al. | |
| 2009/0040667 A1 | 2/2009 | DiSalvo et al. | |
| 2009/0086389 A1 | 4/2009 | Huang et al. | |
| 2009/0086390 A1 | 4/2009 | Huang | |
| 2009/0161271 A1 | 6/2009 | Huang et al. | |

FOREIGN PATENT DOCUMENTS

| | | |
|---|---|---|
| CA | 2383738 | 10/2002 |
| WO | WO/00/14842 | 3/2000 |
| WO | WO0014842 | 3/2000 |
| WO | WO 03/079031 | 9/2003 |
| WO | WO/2009/097469 | 8/2009 |
| WO | WO2009097469 | 8/2009 |

* cited by examiner

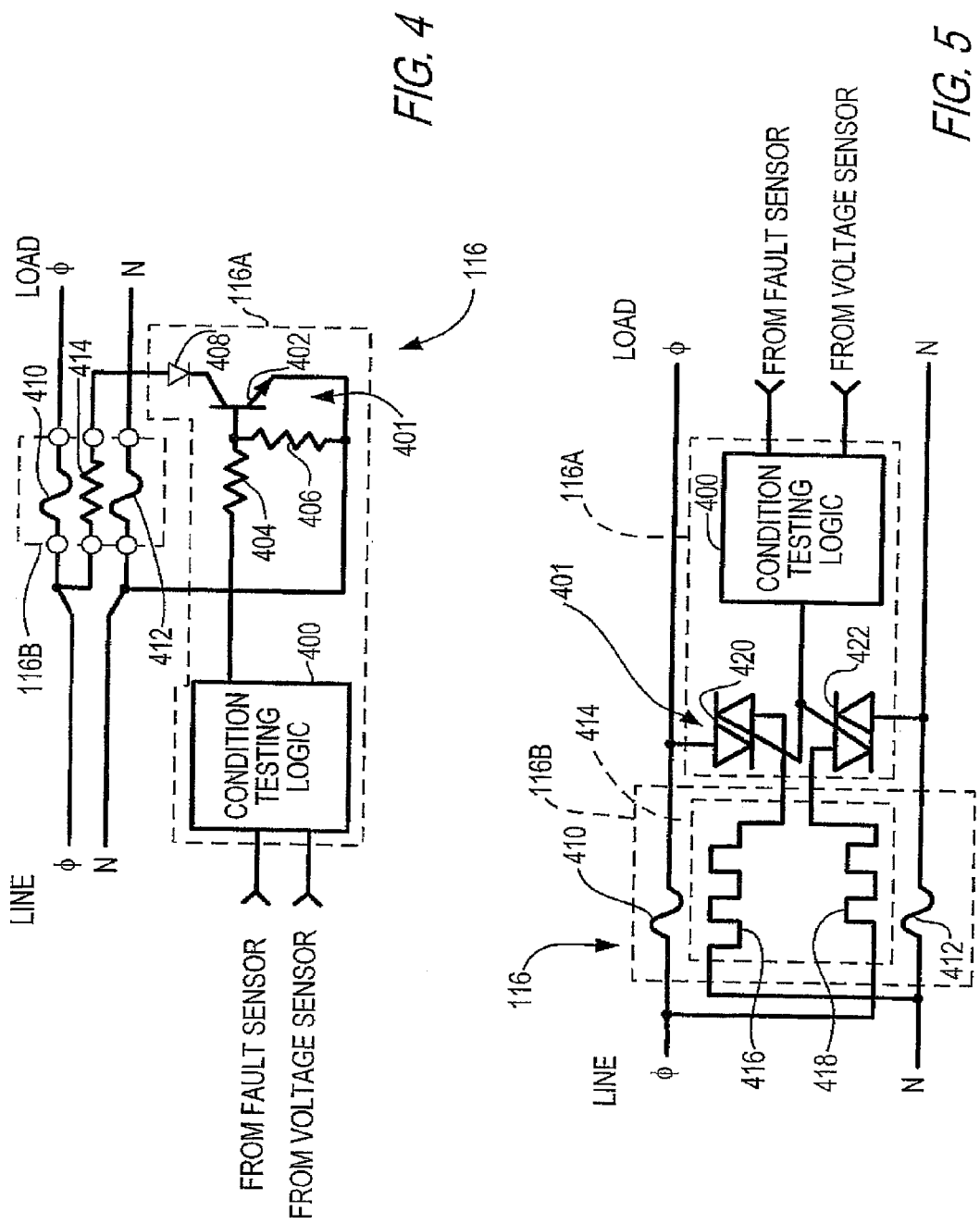

CIRCUIT INTERRUPTING DEVICE WITH AUTOMATIC TEST

CROSS REFERENCE TO RELATED APPLICATIONS

This application is a continuation of application Ser. No. 11/466,757 filed on Aug. 23, 2006, which is a non-provisional application that claims priority from provisional application Ser. No. 60/711,303 filed on Aug. 24, 2005, wherein the disclosures of both applications are hereby incorporated herein by reference in their entirety.

BACKGROUND

The present application is directed to resettable circuit interrupting devices including without limitation ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms.

DESCRIPTION OF THE RELATED ART

Many electrical wiring devices have a line side, which is connectable to an is electrical power supply, and a load side, which is connectable to one or more loads and at least one conductive path between the line and load sides. Electrical connections to wires supplying electrical power or wires conducting electricity to the one or more loads are at line side and load side connections respectively. The electrical wiring device industry has witnessed an increasing call for circuit breaking devices or systems which are designed to interrupt power to various loads, such as household appliances, consumer electrical products and circuits or systems branching from the device. In particular, electrical codes require electrical circuits in home bathrooms and kitchens to be equipped with ground fault circuit interrupters (GFCI), for example. Presently available GFCI devices, such as the device described in commonly owned U.S. Pat. No. 4,595,894, which is incorporated herein in its entirety by reference, use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

Over the years circuit interrupting devices have evolved to include circuit interrupting devices with a reset lock-out function intended to prohibit devices with, for example, an inoperable circuit interrupting portion (i.e., fault sensing circuit and trip mechanism), an open neutral condition, or a reverse wiring condition, from being reset. Commonly owned U.S. Pat. No. 6,040,967, (hereinafter "the '967 patent) which is incorporated herein in its entirety by reference, describes a family of resettable circuit interrupting devices capable of 10 locking out the reset portion of the device if the circuit interrupting portion (referred to as the "circuit interrupter in the '967 patent) is non-operational or if an open neutral condition exists. Commonly owned U.S. Pat. No. 6,246,558, which is incorporated herein in its entirety by reference, describes a family of resettable circuit interrupting devices capable of locking out the reset portion of the device if a reverse wiring condition exists.

While most, if not all, existing circuit interrupting devices meet existing standards governing electrical fault protection devices, there are indications that next generation standards may require circuit interrupting devices capable of permanently interrupting the power supplied to the load side of the device in the event the device is no longer capable of operating according to applicable standards. Further, next generation standards may require automatic testing of the trip mechanism of the device and permanently interrupting the power supplied to the load side of the device in the event the device is no longer capable of operating according to applicable standards.

SUMMARY

The present disclosure relates to resettable circuit interrupting devices having self-test and permanent power interrupting systems. The permanent power interrupting system is activated when a circuit interrupting device experiences a device malfunction. The device malfunction refers to circumstances and/or conditions where the circuit interrupting device of the present invention is unable to operate in accordance with applicable standards governing the device and/or is unable to operate in accordance with its design characteristics.

In one embodiment the circuit interrupting devices includes a phase conductive path and a neutral conductive path each conductive path having a line side and a load side. A fault sensor is provided to monitor the phase and neutral conductive paths for a fault condition and said fault sensor outputs a condition signal in the event a fault condition is detected. Thus, the condition signal indicates that a fault condition has been detected. The fault condition can be a ground fault, an arc fault, an appliance leakage fault, an immersion fault or the results of a test of some or all of the circuit interrupting portion. A relay controller coupled to a relay is provided and said relay controller is configured to receive the condition signal. In this configuration, when the relay controller receives the condition signal the relay controller energizes the relay causing electrical discontinuity in the phase and neutral conductive paths between the line side and load side. A sensor is provided for monitoring the load side of the circuit interrupting device. For example, a load voltage sensor can be provided to measure the voltage between the phase and neutral conductive paths at the load side and to output a voltage signal in response to the measured voltage; this measured voltage signal is generally referred to as a monitoring signal. The power interrupting system is provided to cause permanent or non-resettable electrical discontinuity in the conductive paths in response to the detection of a device malfunction. In general, the device malfunction is detected based upon the condition signal and the monitoring signal. Examples of device malfunctions include the improper operation of all or a part of the fault sensing circuitry, improper operation of all or a part of the mechanical components of the circuit interrupting device, e.g., a faulty solenoid or fused contacts, or the improper operation of all or a part of the support circuitry for the circuit interrupting device, e.g., the self-test system or controllers.

The power interrupting system includes a power interrupting controller and a power interrupter capable of causing the permanent electrical discontinuity in the phase and neutral conductive paths between the line side and load side. Preferably, the power interrupter includes a fuse assembly (e.g., at least one fusible link) thermally coupled to a heater assembly (e.g., at least one heating element). The power interrupting controller may be a switching network, or a combination of a switching network and condition test logic circuitry (or a microcontroller or microprocessor) capable of receiving inputs from a plurality of sensors, processing said inputs and activating the switching network in response to the inputs from the plurality of sensors.

The circuit interrupting device may further include a self-test system capable of automatically inducing a fault condition into the fault sensor or inducing conditions that typically result when a fault occurs (e.g., a current imbalance between phase and neutral conductors when a ground fault occurs).

In an alternative embodiment, the circuit interrupting device includes a housing, and a phase conductive path and a neutral conductive path each disposed at least partially within the housing between a line side and a load side. Preferably, the phase conductive path terminates at a first connection capable of being electrically connected to a source of electricity, a second connection capable of conducting electricity to at least one load and a third connection capable of conducting electricity to at least one user accessible load. Similarly, the neutral conductive path terminates at a first connection capable of being electrically connected to a source of electricity, a second connection capable of providing a neutral connection to the at least one load and a third connection capable of providing a neutral connection to the at least one user accessible load. The device also includes a circuit interrupting portion disposed within the housing and configured to cause electrical discontinuity in the phase and neutral conductive paths between the line side and the load side upon the occurrence of a fault condition. The fault condition can be a ground fault, an arc fault, an appliance leakage fault, an immersion fault or the result of a test of a part of or all of the circuit interrupting portion. A power interrupting system is also disposed within the housing and configured to cause permanent or non-resettable electrical discontinuity in the phase and neutral conductive paths between the line side and the load side upon the occurrence of a device malfunction.

BRIEF DESCRIPTION OF THE DRAWINGS

Preferred embodiments of the present application are described herein with reference to the drawings in which similar elements are given similar reference characters, wherein:

FIG. 4 is a schematic representation of one embodiment of a power interrupting system for disconnecting power to the load side of the GFCI device of FIG. 2;

FIG. 5 is a schematic representation of yet another alternative embodiment of a power interrupting system for disconnecting power to the load side of the device of FIG. 2;

DETAILED DESCRIPTION OF EMBODIMENTS

Figure 1:
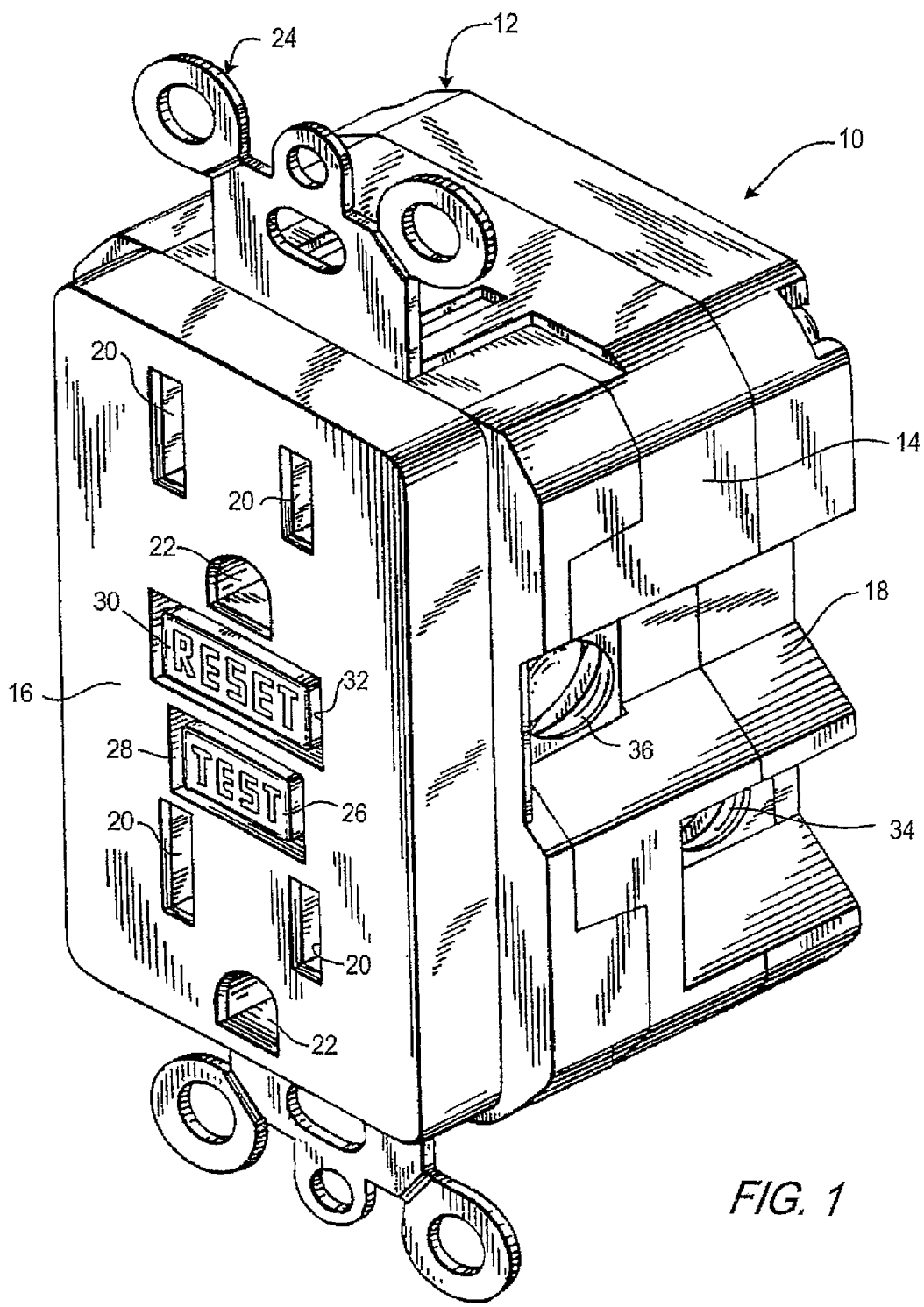
FIG. 1 is a perspective view of a circuit interrupting device (implemented as a GFCI) constructed in accordance with the present invention.

The present disclosure contemplates various types of circuit interrupting devices that are capable of breaking at least one conductive path at both a line side and a load side of the device. The conductive path typically has at least a first end (i.e., the line side) that connects to a source of electrical power and at least a second end (i.e., the load side) that connects to one or more loads. As noted, the various devices in the family of resettable circuit interrupting devices include: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present disclosure, the structure, mechanisms or systems used in the circuit interrupting devices, shown in the drawings and described hereinbelow, are incorporated into a GFCI receptacle suitable for installation in a single-gang junction box used in, for example, a residential electrical wiring system. However, the mechanisms and systems according to the present disclosure can be included in any of the various devices in the family of resettable circuit interrupting devices.

The GFCI receptacles described herein have line, load and user accessible phase connections, line, load and user accessible neutral connections. The load and user accessible connections permit external conductors or appliances to be connected to the device and the line connections permit electrical connection to a source of electricity; these connections may be implemented, for example, with electrical fastening devices that secure or connect external conductors to the circuit interrupting device, as well as conduct electricity. Examples of such connections include binding screws, lugs, terminals and external plug connections.

The circuit interrupting and reset portions described herein preferably use electro-mechanical components to break (open) and make (close) one or more conductive paths between the line and load sides of the device. However, electrical components, such as solid state switches, semiconductor components, integrated circuits and other supporting circuitry, may be used to open and close the conductive paths.

Generally, the circuit interrupting portion is used to automatically break electrical continuity in one or more conductive paths (i.e., open the conductive path) between the line and load sides upon the detection of a fault, which in the particular embodiments described is a ground fault. The reset portion is used to close the open conductive paths. In the embodiments including a reset lockout, the reset portion is used to close the open conductive paths when allowed by the reset lockout. In this configuration, the operation of the reset and reset lockout portions is in conjunction with the operation of all or part of the circuit interrupting portion, so that electrical continuity in open conductive paths cannot be reset if all or part of the circuit interrupting portion is non-operational, if an open neutral condition exists and/or if the device is reverse wired. It should be noted that the disclosure is not limited to embodiments where all of the circuit interrupting portion is activated by depressing the reset button for devices with the reset lockout feature. That is, all or a part of the circuit interrupting portion can be activated when the reset button is depressed and the reset lockout will prevent the device from being reset if the activated portion is not operating properly. Therefore, the present disclosure also contemplates embodiments where a portion of the circuit interrupting portion is used in conjunction with the reset or reset lockout portions.

In an alternative embodiment, the circuit interrupting devices may also include a trip portion that operates independently of the circuit interrupting portion so that in the event the circuit interrupting portion becomes non-operational the device can still be tripped. Preferably, the trip portion is manually activated and uses mechanical components to break one or more conductive paths. However, the trip portion may use electrical circuitry and/or electromechanical components 10 to break either the phase or neutral conductive path or both paths.

The above-described features can be incorporated in any resettable circuit interrupting device, but for simplicity the descriptions herein are directed to GFCI receptacles. A more detailed description of a GFCI receptacle is provided in U.S. Pat. Nos. 4,595,894; 6,437,700; 6,040,967 and 6,246,558 which are incorporated herein in their entirety by reference.

It should also be noted that binding screws are exemplary of the types of wiring terminals that can be used to provide the electrical connections. Examples of other types of wiring terminals include set screws, pressure clamps, pressure plates, push-in type connections, pigtails and quick-connect tabs.

Turning now to FIG. 1, the exemplary GFCI device 10 shown is a GFCI receptacle having a housing 12 consisting of a relatively central body 14 to which a face or cover portion 16 and a rear portion 18 are removably secured. The face portion 16 has entry ports 20 for receiving normal or polarized prongs of a male plug of the type normally found at the end of a cord for an appliance (e.g., a lamp), as well as ground-prong-receiving openings 22 to accommodate a three-prong plug. The receptacle also includes a mounting strap 24 used to fasten the receptacle to a junction box.

A reset button 30 forming a part of a reset mechanism extends through opening 32 in the face portion 16 of the housing 12. The reset button is used to reestablish electrical continuity between the input and output conductive paths or conductors. A test button 26 extends through opening 28 in the face portion 16 of the housing 12. The test button is used to manually activate a test cycle, which test the operation of all or part of a circuit interrupting portion of the device.

Electrical connections to existing household electrical wiring are made via binding screws 34 and 36, where screw 34 is an input (or line) connection point s and screw 36 is an output (or load) connection point. It should be noted that two additional binding screws (not shown) are located on the opposite side of the receptacle 10. Similar to binding screws 34 and 36, these additional binding screws provide input and output connection points. Further, the input connections are for line side phase (hot) and neutral conductors of the household wiring, and the output connections are for load side phase (hot) and neutral conductors of the household wiring. The plug connections are also considered output conductors. The circuit interrupting portion, to be described in more detail below, is used to break electrical continuity between input (line) and output (load) conductive paths (or conductors).

Figure 2:
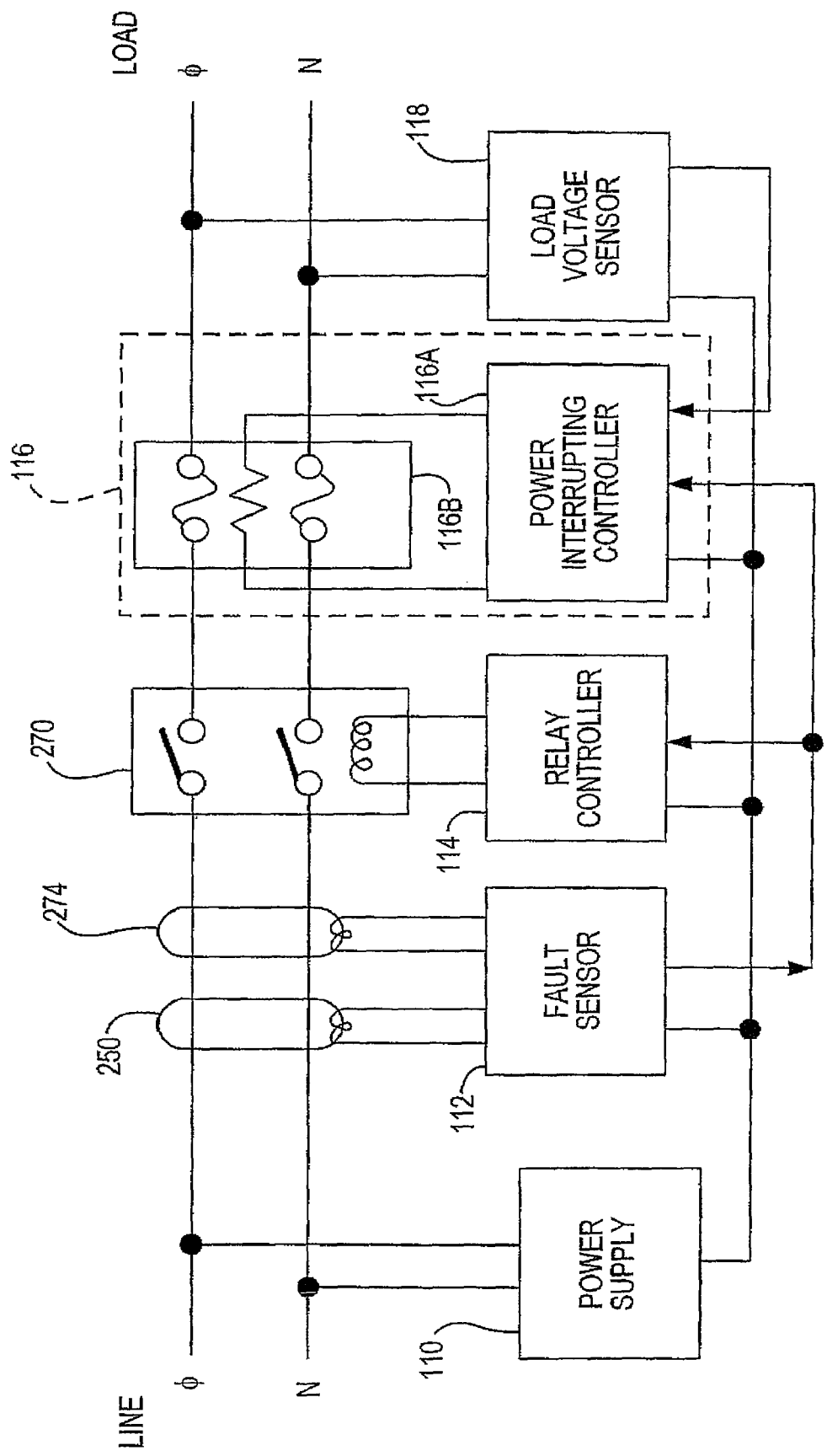
FIG. 2 is a schematic representation of one embodiment of the circuit interrupting device of the present invention having a power interrupting system and an optional automatic self-test system.

Referring to FIG. 2, a block diagram of the electrical components of a GFCI device with a circuit interrupting system and optional automatic self-test system is shown. In this embodiment, the device includes a power supply 110 connected to the line side phase and neutral conductors, that utilizes known techniques to convert AC line voltage to DC power suitable for supplying power to the fault sensor 112, relay controller 114, power interrupting controller 116A and load voltage sensor 118. It should be noted that the fault sensor 112, relay controller 114 and relay 270 are associated with the circuit interrupting portion of the device.

In one embodiment, the fault sensor 112 utilizes a pair of differential transformers 250 and 274 that monitors the AC phase and neutral conductors for ground fault conditions and generates control signals to relay controller 114 and to power interrupting controller 116 in the event a ground fault condition is detected or a self-test cycle is performed. For example, if a ground fault condition is detected by fault sensor 112, a signal is sent to relay controller 114 causing the controller 114 to energize relay 270 thus opening the conduction path (causing electrical discontinuity) between the line side and load side phase and neutral conductors.

Figure 3:
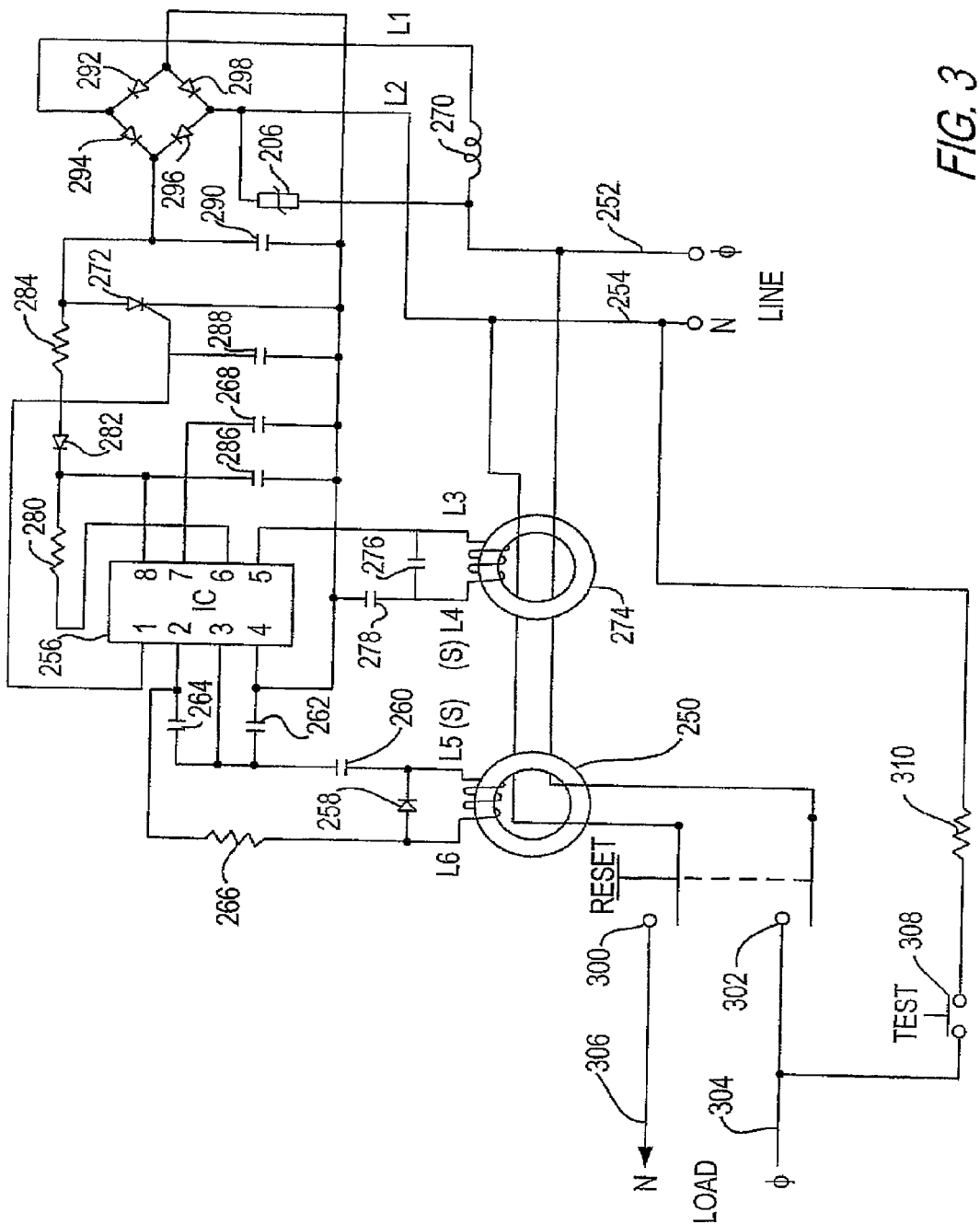
FIG. 3 is a schematic representation of one embodiment of a fault sensor and relay controller for detecting ground faults and resetting the device of FIG. 2.

One implementation of the fault sensor 112, relay controller 114 and relay 270 is shown in FIG. 3. However, other implementations of the fault sensor, relay controller and relay are also contemplated. Referring to FIG. 2, a schematic representation of conventional circuitry for the fault sensor 112 used to detect fault conditions, here ground faults, and relay controller 114 and relay 270 are used to open the phase and neutral conductive paths in the event a ground fault is detected. Typically, the fault sensor uses a differential transformer and neutral transformer to sense ground faults and energize a relay that disconnects power to the load side in the event a ground fault is detected. The circuit of FIG. 3 is for single phase applications with 120 volts line to ground, is exemplary of a fault sensor 112 and relay controller 114, and operates in the following manner:

For phase to neutral fault detection, differential transformer 250 monitors the flow of current in the line side phase and neutral conductors, 252 and 254, respectively, and produces in its secondary winding a fault or condition signal when the current flowing in the phase conductor (or conductors) 252 does not equal the current flowing in the neutral conductor 254. The output from the secondary of differential transformer 250 (i.e., the condition signal) is conveyed to integrated circuit 256 through diode 258, capacitors 260, 262 and 264, and resistor 266. Integrated circuit 256 may be a type LM 1851 Ground Fault Interrupter manufactured by National Semiconductor Corporation. Diode 258 and resistor 266 are arranged so as to promote quick discharge of capacitor 260. This discharge of capacitor 260 allows integrated circuit 256 to be kept continuously energized and thus considerably reduces the time required for detection of a fault. Continuous energization of integrated circuit 256 from the line side is made possible by capacitor 268 which is attached to output pin 7 of integrated circuit 256, which basically controls the trip circuit while minimizing burnout of the trip coil 270.

For neutral to ground fault detection (otherwise referred to as a ground neutral condition), the fault sensor 112 functions similarly to the phase to neutral fault detection described above. Transformer 274 (together with differential transformer 250) form part of an induction coil that has a signal induced on its secondary windings that is carried through capacitors 276 and 278 to input pin 4 of integrated circuit 256. This induced signal is another type of a condition signal indicating to integrated circuit 256 that a ground neutral condition has been detected and that the device should be tripped. Thus, at least two types of ground faults can be detected by the circuit diagram shown in FIG. 3: phase to neutral fault and a neutral to ground fault.

The trip circuit for both types of faults is identical in that if a fault (ground fault or ground neutral condition) is detected by the input pins 2, 3, and 4 of IC 256, a signal is output from pin 7 of integrated circuit 256 causing capacitor 268 to charge. The signal from pin 1 of integrated circuit 256 is applied to the gate of SCR 272 causing said SCR to conduct causing current to flow through coil 270 thus energizing coil 270. Coil 270 is part of a relay which includes a plunger (not shown) and when coil 270 is energized, the plunger is caused to move to engage movable arms to disconnect the line (phase and neutral) conductors from the load (phase and neutral) conductors. In particular, upon energization of coil 270, contacts 300 and 302 of the ground fault circuit interrupter are opened which in turn disconnects power to the load side phase and neutral conductors 304 and 306.

Figure 3A:
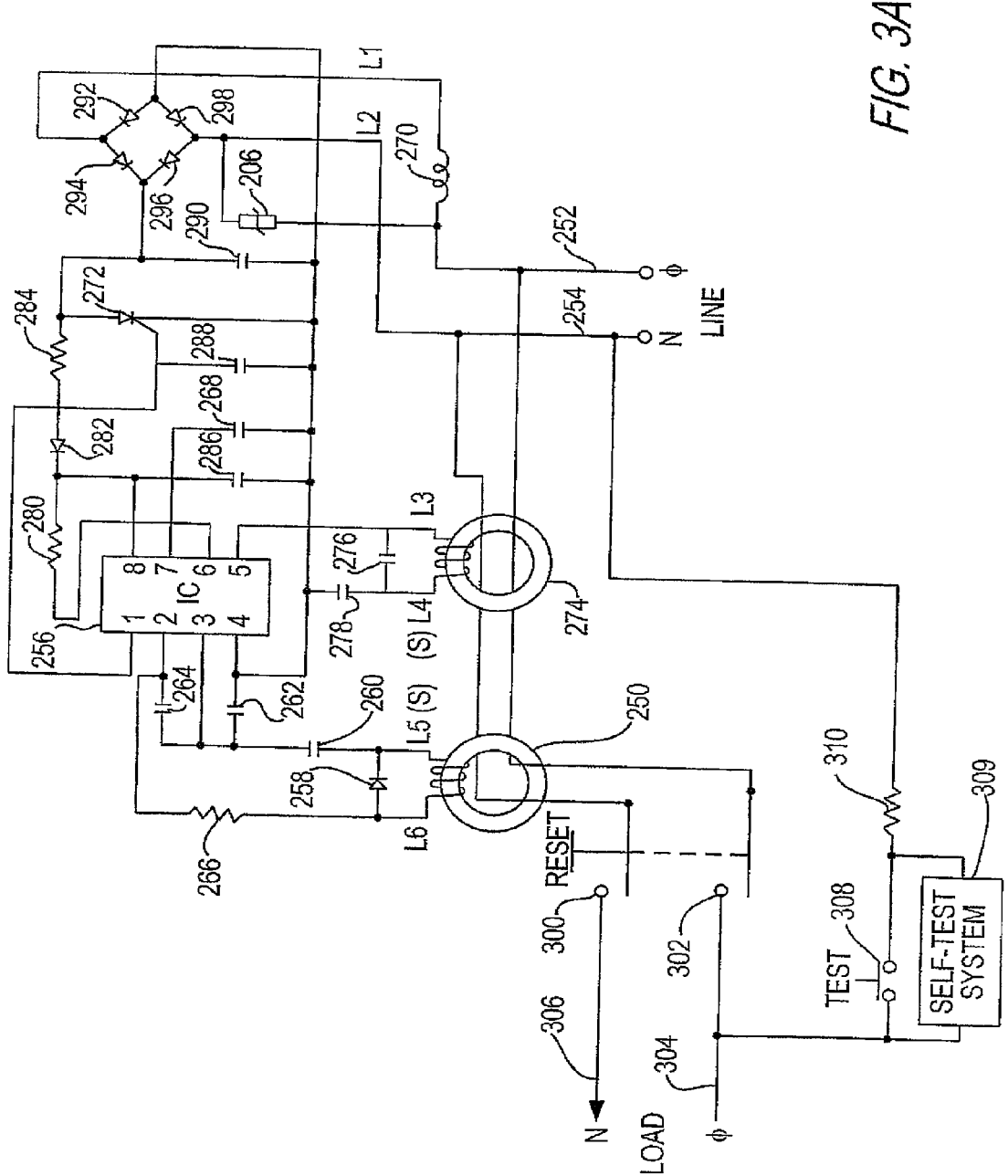
FIG. 3A is a schematic representation of FIG. 3 with a self test system.

The fault sensor 112 may include a push-button 308 and resistor 310 as part of a self-test system that induces a ground fault condition simulation (i.e., a current imbalance is caused) onto the line side conductors for detection by the fault sensor 112. Alternatively or in addition to push button 308, a self-test system 309 (seen in FIG. 3A) can be incorporated into the fault sensor 112. The self test system uses TEST button 308 for manual activation of the self test. However, the self-test system 309 is preferably configured to periodically output a test signal through resistor 310 to induce a ground fault condition simulation onto the line side conductors for detection by the fault sensor 112, thus permitting automatic testing of all or part of the circuit interrupting portion. The self-test system may be a clocking circuit configured to output a test signal, for example, once a day, once a week, or once a month. When all or part of the fault sensor circuitry is tested the device is typically set in a tripped state. As a result, the device would need to be reset. The device can then be manually reset using the reset button, or and automatic reset operation could be performed where a reset signal is generated causing the line and load side connections to be reestablished. Since the timing of the self-test may be inconvenient, i.e., when the device is in use, it may be desirable to have the self-test system send a signal to the relay controller 114 to cause the relay 124 to close immediately after it has been opened by the detection of the simulated fault induced by the self-test system. If a self-test is activated when, for example, the device is in use, it is preferable that the self-test cycle and reset time is fast enough so that a human would not notice the brief disruption of power provided to the load. That is, the time between the energizing of the relay 270 to open the conductive paths between line and load phase and neutral conductors and the time the relay closes the conductive paths between line and load phase and neutral conductors is sufficiently small that the disruption in power provided to any load is not significant (i.e., will not adversely affect the operation of the connected load) or detectable by a human.

It should be noted that in the event the circuit interrupting device is a reset lock-out type circuit interrupting device, resetting of the device is prevented if all or any portion of the circuit interrupting portion (i.e., fault sensor 112, differential transformers 250 and 274, relay controller 114 and relay 270) is not functioning properly, or if all or any portion of the relay controller or relay are not functioning properly, or if both the fault sensor and relay controller and relay are not functioning properly. Examples of reset lockout type circuit interrupting devices are described in commonly owned U.S. Pat. Nos. 6,040,967; 6,381,112; 6,657,834 and 6,671,145 each of which is incorporated herein in its entirety by reference.

Referring again to FIG. 2, the circuit interrupting device according to the present disclosure may include a power interrupting system 116 capable of causing permanent electrical discontinuity in the conductive paths (i.e., opening the conductive paths) between the line side phase and neutral conductors and the load side phase and neutral conductors in the event one or more device malfunctions exist. The power interrupting system 116 includes a controller 116A and a power interrupter 16B. In the embodiment of FIG. 2, the controller 116A receives signals from the fault sensor 112 and load voltage sensor 118 and uses logic circuitry to determine whether or not one or more device malfunctions exist. In the event one or more device malfunctions is detected the power interrupter 116B is activated by controller 116A to cause all or a part of the power interrupting system to become disabled and thus cause non-resettable electrical discontinuity in the phase and neutral conductive paths preventing power distribution to the load side of the circuit interrupting device 10.

The power interrupting system 116 will be described with reference to the various exemplary embodiments depicted in FIGS. 4-7. In the embodiment of FIG. 4, the power interrupting controller 116A includes condition testing logic circuit 400 capable of receiving inputs from either the fault sensor 112, the load voltage sensor 118 (seen in FIG. 2) or both. For example, the gate input of SCR 272 (seen in FIG. 3 and shown as originating from pin 1 of IC 256) on which the trip signal is received and is used to energize relay 270 could be inputted to the condition test logic circuit 400. The output of the condition testing logic is transferred to switching assembly 401 including transistor 402, biasing resistors 404 and 406 and rectifying diode 408. Here the output of the condition testing logic is transferred to the base of transistor 402. If the gate input of SCR 272 is used as the input to the condition test logic circuit 400, and the SCR is activated beyond its design time period, which may be indicative of a device malfunction, the power interrupter 116B may be sufficiently activated to cause all or a part of the power interrupter to become disabled, thus causing non-resettable electrical discontinuity in the phase and neutral conductive paths and preventing power distribution to the load side of the circuit interrupting device 10. It should be noted that an SCR or Triac could be used for the switching assembly 401 as shown in FIG. 5.

Continuing with FIG. 4, the power interrupter 116B includes a fuse assembly, e.g., thermal fusible links 410 and 412, connected in series with the phase and neutral conductive paths as shown, and heater assembly 414 thermally coupled to the fuse assembly. In this configuration, when energy is supplied to the heater assembly heat is transferred to the fuse assembly, here the fusible links. When sufficient heat energy is transferred to the fuse assembly to cause the fuse assembly to open, non-resettable or limited resettable electrical discontinuity in the phase and neutral conductive paths occurs. As a result, power to the load side of the circuit interrupting device is removed.

The fusible links could be, for example, lengths solder or other material that when heated to a certain temperature open or otherwise break the respective conductive path. The fusible links may also include thermal fuses, thermally activated switches, a muscle wire formed of, for example, a material described in Appendix A (attached to this application and which is incorporated herein by reference) and other thermally responsive devices and/or materials capable of changing their shape, length or overall structure when subjected to a certain amount of heat. It should be noted that in instances where a thermally responsive material is used as the fusible link having characteristics of breaking the conductive paths when heated and reestablishing the conductive paths when cooled, the electrical discontinuity in the conductive path is a limited resettable electrical discontinuity. It should also be noted that non-thermal fusible links are also contemplated by the present disclosure.

Further, thermally responsive materials can be incorporated in a circuit interrupting device and more particularly interfaced with the circuit interrupting portion of a circuit interrupting device (activated with a TEST button) or interfaced with the reset mechanism of the circuit interrupting device (activated with a RESET button)—for circuit interrupting devices having the reset lockout feature or for devices that do not have the reset lockout feature. As shown in Appendix B attached to this application and which is incorporated herein by reference, a material such as Flexinol (shape memory alloy) can be coupled to the reset mechanism (including a reset button) of a circuit interrupting device shown in FIG. 1 (such a device is disclosed in an application titled Circuit Interrupting Device and System Utilizing Bridge Contact having Ser. No. 10/690,776, which is incorporated herein by reference) so that the expansion or contraction of these materials when subjected to a threshold amount of heat will change their shape accordingly to interact with the TRIP button causing the circuit interrupting device to trip or interact with the reset button causing the circuit interrupting device to reset which automatically tests all or part of the circuit interrupting portion when the circuit interrupting device has the reset lockout feature.

The heater assembly 414 could include the solenoid (e.g., trip coil 270) provided with conventional circuit interrupting devices and used to open and close the conductive paths that perform the circuit interrupting operation of the device. If the solenoid is used as the heater assembly 414, sufficient heat is 10 generated when the solenoid is activated for a period of time that exceeds the normal time needed to trip the circuit interrupting device. Alternatively, the heater assembly 414 may be a heating element, e.g. a resistor.

On embodiment is to connect a heating element such as a resistor in parallel with the solenoid. This heater would act on an expanding or contracting material in such a manner that the time required to cause a reaction is greater than the maximum allowable trip time of the circuit interrupting device. The expansion and/or contraction would be able to permanently disable the device when such expanding material is engaged or coupled to at least a portion of the circuit interrupting portion.

Thermal coupling of the heater assembly to the fuse assembly could be achieved by, for example, wrapping solder lengths (the fuse assembly) around one or more resistors acting as the heater assembly 414.

In operation, when the output signal from the condition testing logic 400 is sufficient to turn on transistor 402 current will flow through the heater assembly heating the fusible links until they open the respective conductive path. If the fusible links are solder lengths, the solder would melt when heated thus permanently opening the respective conductive path. As noted above, if a thermal responsive material is used as the fusible link having characteristics where when heated a break in a conductive path occurs and when cooled the conductive path is again made, the electrical discontinuity in the conductive path is a limited Resettable electrical discontinuity.

In the embodiment of FIG. 5, the power interrupting controller 116A includes condition testing logic 400 capable of receiving inputs from either the fault sensor 112, or load voltage sensor 118 (seen in FIG. 2) or both. The output of the condition testing logic is transferred to switch assembly 401 that includes s triacs 420 and 422. The power interrupter 116B includes a fuse assembly, e.g., thermal fusible links 410 and 412, connected in series with the phase and neutral conductive paths as shown, and heater assembly 414 thermally coupled to the fuse assembly. In this configuration, when sufficient energy is supplied to the heater assembly the fuse assembly, here the fusible links, opens thus causing permanent electrical discontinuity in the phase and neutral conductive paths. As a result, power to the load side of the circuit interrupting device is removed. The fusible links can be similar to those described above. In this embodiment, the heater assembly includes two heating elements 416 and 418, e.g. resistors, where one heating element heats fusible link 410 and the other heats fusible link 412.

Figure 4A:
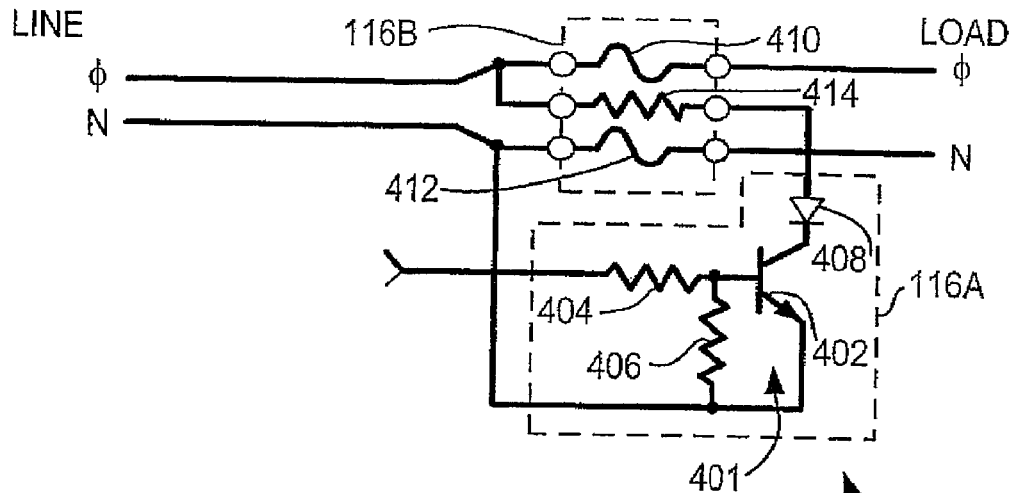
FIG. 4A is a schematic representation of an alternative embodiment of a power interrupting system for disconnecting power to the load side of the GFCI device of FIG. 2.
Figure 5A:
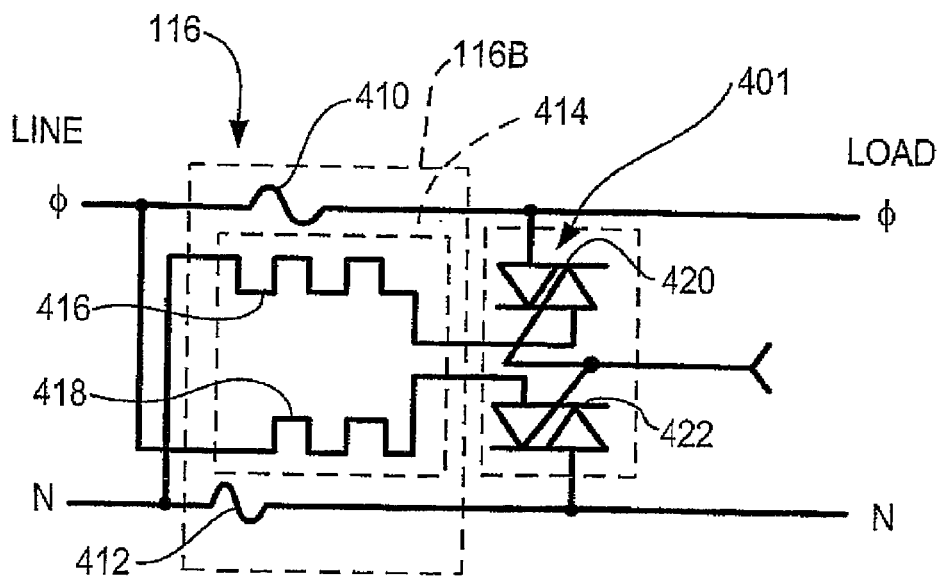
FIG. 5A is a schematic representation of a further alternative embodiment of a power interrupting system for disconnecting power to the load side of the device of FIG. 2.

FIGS. 4A and 5A are similar to FIGS. 4 and 5 respectively, except that the signal supplied to the switch assembly, i.e., power interrupter and/or power interrupting controller comes from an external source, e.g., a controller or supervisory circuit instead of a logic circuit.

Figure 6:
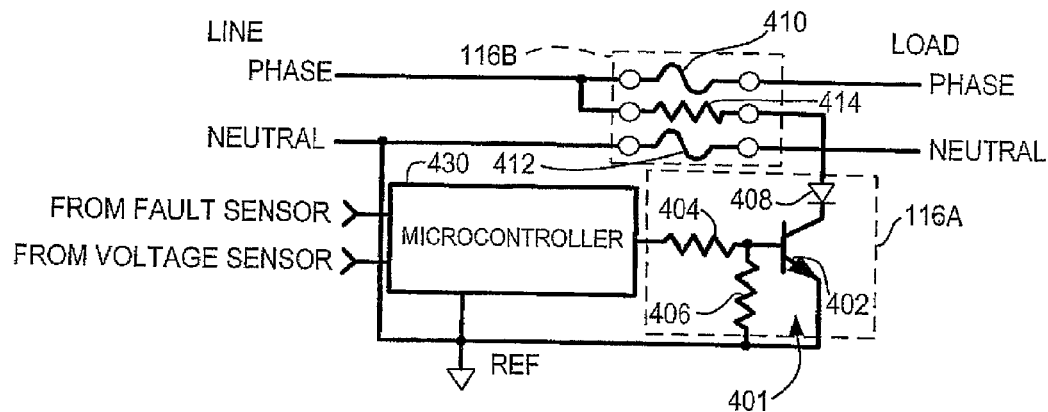
FIG. 6 is a schematic representation of a further alternative embodiment of a power interrupting system for disconnecting power to the load side of the device of FIG. 2.
Figure 7:
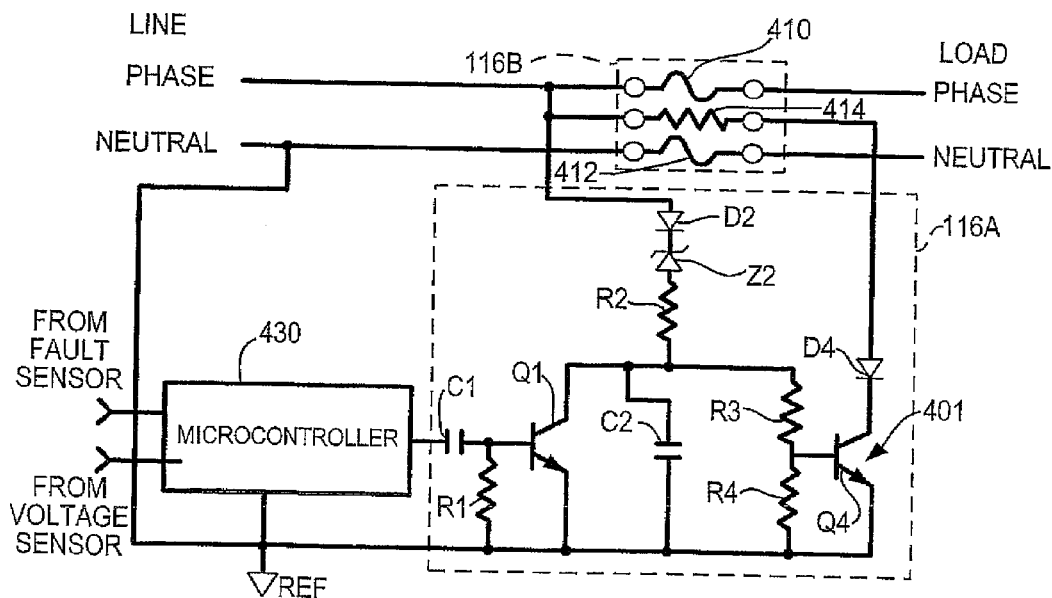
FIG. 7 is a schematic representation of a further alternative embodiment of a power interrupting system for disconnecting power to the load side of the device of FIG. 2.

The embodiment of FIG. 6 is similar to the embodiment of FIG. 4, except that microcontroller 430 provides the signal to the power interrupting controller 116A to cause the power interrupter 116B to open the conductive paths as described above. In this embodiment, the microcontroller 430 can be used to initiate a self-test of the circuit interrupting device operation and in the event a device malfunction is detected by the microcontroller 430 switch assembly is activated causing the heater assembly to activate the fuse assembly to open the conductive paths. FIG. 7 is similar to FIG. 5 except that the switching assembly includes brownout protection. In this embodiment of controller 116A, microcontroller 430 provides an output signal to transistor Q1 via capacitor C1 and resistor R1. Transistor Q1, which controls when transistor Q4 can turn on, is provided to hold the voltage across capacitor C2 to about zero volts and is briefly turned on by the output signal from microcontroller 430. If the output of the microcontroller 430 is left floating, or a short time after the output of the microcontroller is driven high or low, resistor R1 quickly bleeds capacitor C1 thereby turning off transistor Q1. When transistor Q1 is off, transistor Q4 can turn on when the voltage on the phase conductive path overcomes the zener voltage of zener diode Z2, the diode drop across diode D2, and voltage across resistor divider R4/(R2+R3+R4). With transistor Q1 off, voltage on the phase conductive path is free to charge capacitor C2 to the point where transistor Q4 turns on and energize heater assembly 414. Energizing the heater assembly takes place by current flowing from the phase conductive path through the heater assembly 414, through diode D4 and transistor Q4 to the neutral conductive path. Such current flow occurs on positive half-cycles due to diode D4 and when transistor Q4 is turned on. Heater assembly 414 then begins to transfer heat energy to the fusible links 410 and 412, and in the event the heat energy transferred to the fusible links reaches the melting point of the fusible link, then fusible links will break causing electrical discontinuity in the conductive paths.

Figure 8:
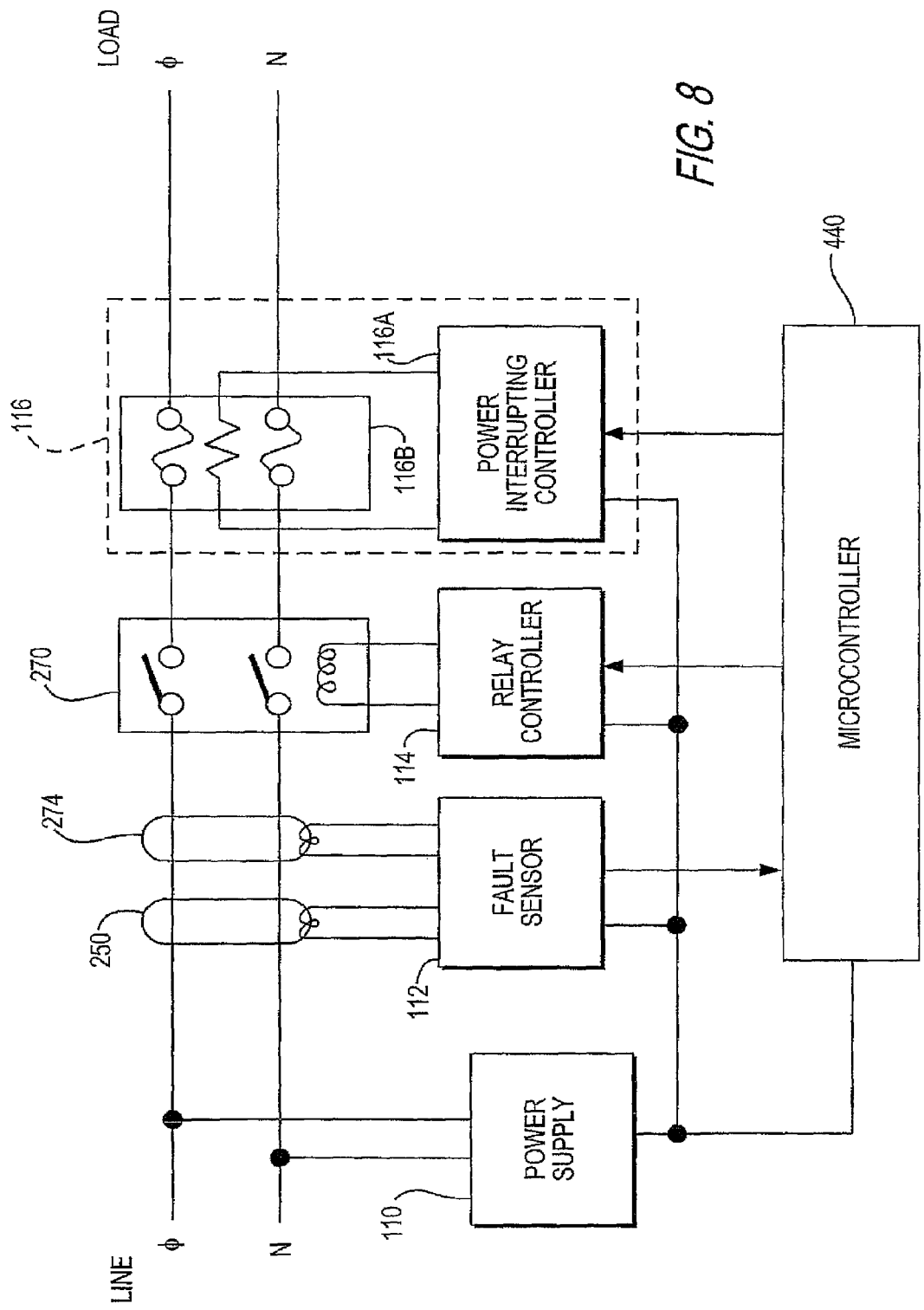
FIG. 8 is a schematic representation of an embodiment of a circuit interrupting device with a power interrupting system and an optional automatic self-test feature.

Referring now to FIG. 8 an alternative embodiment of the circuit interrupting device is shown. In this embodiment, microcontroller 440 is connected to fault sensor 112, relay controller 114 and power interrupting system 116 and is provided to perform a self-test of the fault sensor, relay controller and power interrupting system and determine if one or more device malfunctions exist and then activate the power interrupting system 116 to open the conductive paths as described above.

Figure 9:
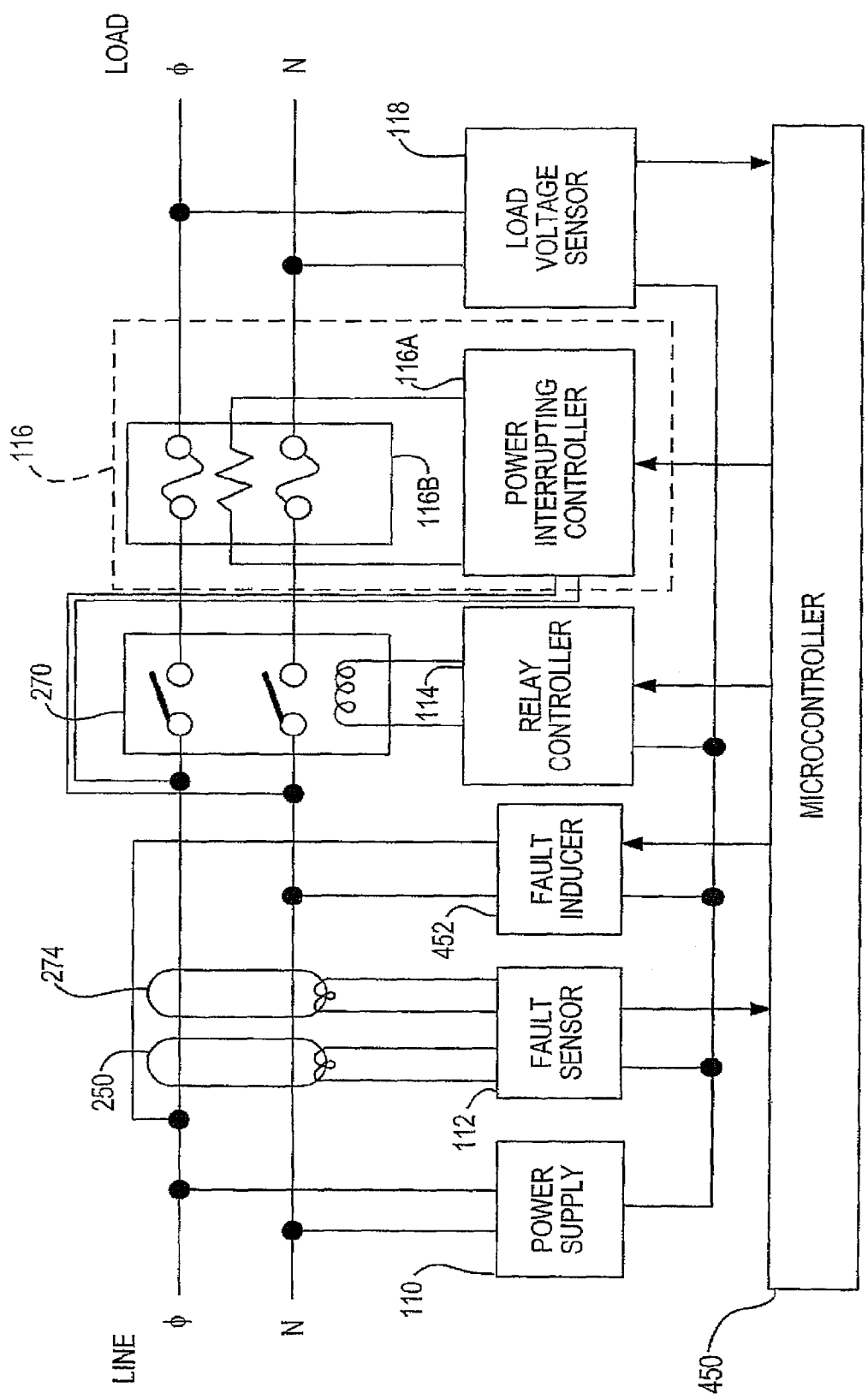
FIG. 9 is a schematic representation of yet another embodiment of a circuit interrupting device with a power interrupting system and an optional automatic self-test system.

Referring to FIG. 9, another alternative embodiment of the circuit interrupting device is shown. In this embodiment, microcontroller 450 is connected to fault sensor 112, fault inducer 452, relay controller 114, power interrupting system 116 and load voltage sensor 118, and is provided to cause the fault inducer 452 to initiate a self-test of the fault sensor, relay controller, relay and power interrupting system and determine if one or more device malfunctions exist and then activate the power interrupting system to open the conductive paths as described above.

Figure 10:
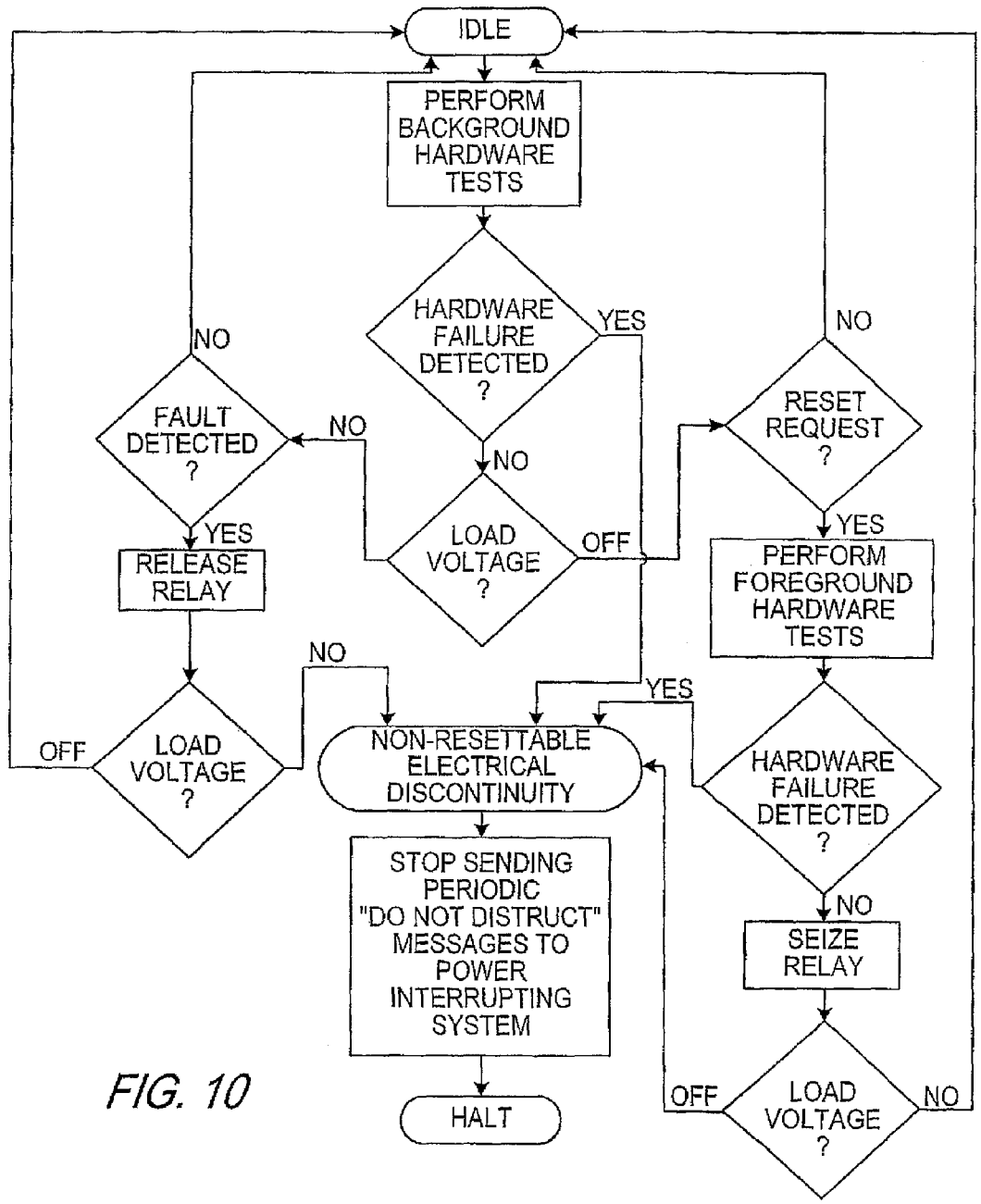
FIG. 10 is an exemplary flow diagram for the operation of the different exemplary embodiments of the power interrupting system controllers.

FIG. 10 provides an exemplary flow diagram for the operation of the microcontroller 440 or 450.

As noted, although the components used during circuit interrupting and some device reset operations are electromechanical in nature, the present application also contemplates using electrical components, such as solid state switches and supporting circuitry, as well as other types of components capable or making and breaking electrical continuity in the conductive path.

While there have been shown and described and pointed out the fundamental features of the application, it will be understood that various omissions and substitutions and changes of the form and details of the device described and illustrated and in its operation may be made by those skilled in the art, without departing from the spirit of the application.

What is claimed is:

1. A circuit interrupting device comprising:
    at least two conductive paths each having a line side and a load side;
    a fault sensor disposed to monitor the at least two conductive paths for a predefined fault condition and disposed to output a condition signal in the event the predefined fault condition is detected;
    a relay;
    a relay controller coupled to said relay and disposed to receive the outputted condition signal, such that when the relay controller receives the condition signal, said relay is disposed to cause electrical discontinuity in the at least two conductive paths between the line side and load side;
    a load voltage sensor disposed to measure the voltage between the at least two conductive paths at the load side and disposed to output a voltage signal in response to the measured voltage; and
    a power interrupting system having a power interrupting controller coupled to the fault sensor and the load voltage sensor and capable of outputting a disconnect signal in response to the detection of a predefined operational condition based upon the condition signal and the voltage signal, and a power interrupter disposed to cause permanent electrical discontinuity in the at least two conductive paths between the line side and load side in response to the disconnect signal.

2. The circuit interrupting device as in claim 1, wherein the at least two conductive paths comprise at least a phase conductive path and at least a neutral conductive path.

3. A fault circuit interrupting device having a line side and a load side, the device comprising:
    a) a fault sensor disposed to monitor a power line for a fault;
    b) at least one first interrupter configured to selectively disconnect electrical continuity between the line side and the load side, the at least one first interrupter comprising:
        i) a relay;
        ii) a relay controller coupled to an output of said fault sensor, said relay controller being disposed to selectively open said relay; and
    c) at least one second interrupter coupled in series with said first interrupter and configured to selectively permanently disconnect electrical continuity between said line side and said load side.

4. The device as in claim 3, wherein said fault sensor comprises an integrated circuit.

5. The device as in claim 3, further comprising at least one microcontroller coupled to said fault sensor and to said relay controller, said microcontroller being configured to selectively operate at least one of said at least one first interrupter and said at least one second interrupter.

6. The device as in claim 5, wherein said microcontroller is configured to perform a self test, and to activate at least one of said at least one first interrupter and said at least one second interrupter when said microcontroller determines that said self test fails.

7. The device as in claim 6, wherein the device further comprises at least two conductive paths, each extending on the line side and the load side, and said self test comprises a current imbalance formed between said at least two conductive paths.

8. The device as in claim 3, wherein the device is selected from the group consisting of ground fault circuit interrupters (GFCI), arc fault circuit interrupters (AFCI), immersion detection circuit interrupters (IDCI), appliance leakage circuit interrupters (ALCI), and equipment leakage circuit interrupters (ELCI).

9. The device as in claim 6, wherein said at least one microcontroller is configured to activate said at least one second interrupter if said at least one first interrupter fails to operate.

10. The device as in claim 3, further comprising at least one microcontroller, wherein said microcontroller is configured to perform an automatic self test on a periodic basis.

11. The device as in claim 6, wherein said self test is a ground fault condition simulation.

12. The device as in claim 11, wherein said ground fault condition simulation is created on the line side of the device.

13. The device as in claim 5, wherein said microcontroller comprises a clock disposed to periodically perform an automatic self test.

14. The device as in claim 12 wherein said microcontroller is configured to send a signal between one of:
    a line side neutral line and a load side phase line; and
    a line side phase line and a load side neutral line.

15. The device as in claim 3, further comprising a self test system comprising at least one clocking circuit disposed to periodically perform a self test on at least one of:
    said fault sensor, and said at least one first line interrupter.

16. The device as in claim 15, wherein said self test system is configured to periodically create a ground fault condition simulation.

17. The device as in claim 16, wherein said ground fault condition simulation is created by passing a signal between one of:
    a line side neutral line and a load side phase line; and
    a line side phase line and a load side neutral line.

18. The device as in claim 3, further comprising at least one voltage sensor disposed to measure a voltage on a load side and disposed to output a voltage signal in response to a measured voltage.

19. The device as in claim 5, further comprising a voltage sensor in communication with the load side of the device, and disposed to measure a voltage on the load side, wherein said microcontroller is coupled to said voltage sensor and at least one of said first line interrupter and said second line interrupter, wherein said microcontroller is configured to operate at least one of said line interrupter after receiving a signal from said voltage sensor.

20. The device as in claim 3, further comprising a voltage sensor, wherein at least one of said first line interrupter and said second line interrupter is coupled to said voltage sensor and is configured to operate when said voltage sensor produces a signal.

21. The device as in claim 3, wherein said at least one second interrupter is a power interrupting system, configured to permanently disconnect electrical communication between the line side and the load side, and wherein said power interrupting system comprises at least one power interrupting controller and at least one power interrupter.

22. The device as in claim 21, wherein said at least one power interrupting controller comprises a condition test logic circuit and at least one switch, wherein an output of said condition test logic circuit is an input into said at least one switch to selectively activate said at least one switch to operate said at least one power interrupter to permanently disconnect electrical communication between said line side and said load side.

23. The device as in claim 22, wherein said at least one switch is selected from the group consisting of a triac, and a transistor.

24. The device as in claim 21, wherein said at least one power interrupter comprises a fuse.

25. The device as in claim 24, wherein said at least one power interrupter comprises a heater disposed to heat said fuse to permanently disconnect electrical continuity between said line side and said load side.

26. A method for performing a self test on a fault circuit interrupter comprising:
  a) performing a self test;
  b) determining if there is a hardware failure;
  c) detecting a load voltage;
  d) determining if there is a reset request; and
  e) permanently disconnecting power to a load side after determining that there was a hardware failure.

27. The method as in claim 26, further comprising the step of performing a second self test after determining that a reset request has been made.

28. The method as in claim 26, further comprising the step of opening at least one relay if the self test on the fault circuit interrupter has failed.

* * * * *